United States Patent [19]

Gebauer

[11] Patent Number: 4,457,171
[45] Date of Patent: Jul. 3, 1984

[54] LIQUID-LEVEL INDICATOR

[75] Inventor: Heinz Gebauer, Ottikon-Gossau, Switzerland

[73] Assignee: Transamerica DeLaval, Inc., Princeton, N.J.

[21] Appl. No.: 527,509

[22] Filed: Aug. 30, 1983

Related U.S. Application Data

[63] Continuation of Ser. No. 286,445, Jul. 24, 1981, abandoned.

[30] Foreign Application Priority Data

Jul. 25, 1980 [CH] Switzerland ............... 5728/80

[51] Int. Cl.³ .......................................... G01F 23/06
[52] U.S. Cl. ................................. 73/305; 73/319
[58] Field of Search ................. 75/305, 319, 313; 116/204; 200/84 C; 340/623, 624; 335/207

[56] References Cited

U.S. PATENT DOCUMENTS

| | | | |
|---|---|---|---|
| 2,920,484 | 1/1960 | Reichert | 73/319 |
| 3,024,659 | 3/1962 | White | 73/319 |
| 3,964,312 | 6/1976 | Sebok | 73/319 |
| 4,194,397 | 3/1980 | Yasuda | 73/319 |

Primary Examiner—Charles Frankfort
Assistant Examiner—David R. Schuster
Attorney, Agent, or Firm—Hopgood, Calimafde, Kalil, Blaustein & Judlowe

[57] ABSTRACT

The present invention relates to an improved liquid-level indicator. The liquid-level indicator comprises an upstanding tube and a float arranged for vertical movement therein. This float is provided with a permanent magnet which is polarized in a horizontal plane and influences magnetically an array of display elements. These display elements are located outside of the tube. The display elements are rotatably supported and arranged in succession one above the other. Between the display elements and the tube there extends a magnetic strip arranged such that the permanent magnet of the float is oriented towards the display elements. This magnetic strip also pre-tensions the display elements. It is located outside of the tube and at a distance from the float.

2 Claims, 2 Drawing Figures

LIQUID-LEVEL INDICATOR

This application is a continuation of application Ser. No. 286,445, filed July 24, 1981 now abandoned.

BACKGROUND OF THE INVENTION

1. Field of the Invention

The present invention relates to a liquid-level indicator for a container, which liquid-level indicator is provided with an upstanding tube and a float means guided for vertical mevement therein. The float means is provided with a permanent magnet means which is polarized in a horizontal plane and which influences magnetically a display means located outside of the tube. The display means is arranged in the form of a plurality of rotatably supported display elements arranged in succession one above the other.

2. Description of the Prior Art

A known liquid-level indicator comprises a guide wire which is arranged to position the float such that it is oriented towards the display elements. The guide wire is welded to the inner wall of the tube to extend vertically therein. This guide wire cooperates with a guide bracket arranged on an outer wall of the float. The manufacture and production of this known design is rather difficult, and in use it has the inherent drawback that the display means containing the display elements cannot be rotated to an arbitrary position relative to the tube wall.

SUMMARY OF THE INVENTION

Hence, it is a general object of the present invention to provide an improved liquid-level indicator which overcomes the above outlined drawbacks.

A further object of the invention is to provide an improved liquid-level indicator which comprises a vertically extending magnetic strip located between the display elements and the tube. The magnetic strip is arranged to cause said permanent magnet of the float to be oriented towards the display elements and to simultaneously pre-tension said display elements.

A further object is to provide an improved liquid-level indicator of the foregoing construction in which the magnetic strip is located outside of the tube and at a distance from the float.

Due to the double function of the magnetic strip a greater operable range of spacing between the magnetic strip and the permanent magnet of the float is available.

BRIEF DESCRIPTION OF THE DRAWINGS

The invention will be better understood, and objects other than those set forth above will become apparent, when consideration is given to the following detailed description thereof. Such description makes reference to the annexed drawings, wherein.

DETAILED DESCRIPTION OF THE PREFERRED EMBODIMENT

Figure 1:
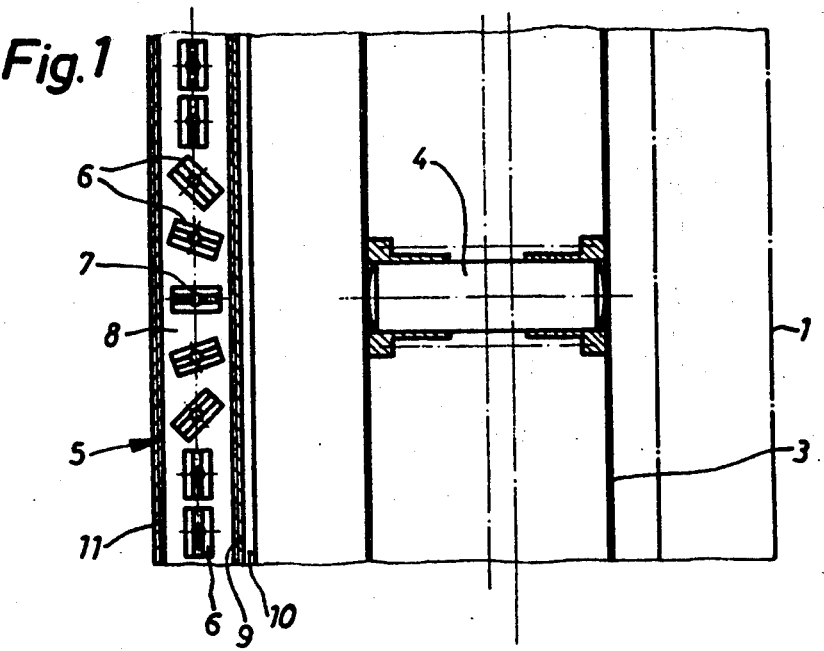
FIG. 1 is a view of a vertical section of a part of a liquid-level indicator constructed according to the present invention.

Describing now the drawings and considering initially the exemplary embodiment of a liquid-level indicator as shown in FIG. 1, it will be understood that said indicator comprises a tube 1 which is arranged to communicate with a liquid storage container not particularly shown. Within the tube 1 which is manufactured of a magnetically neutral material there is arranged a tubelike float 3 in which a permanent magnet body 4 is mounted such that its axis 2 extends in the plane defined by the level of the liquid present in tube 1.

A display device, consisting of a rail 5 provided with a plurality of display elements 6 located one above the other, is mounted on the outer surface of tube 1. The display elements 6 are rotatably mounted by means of trunnions 7 journaled in the legs 8 of the rail 5.

Figure 2:
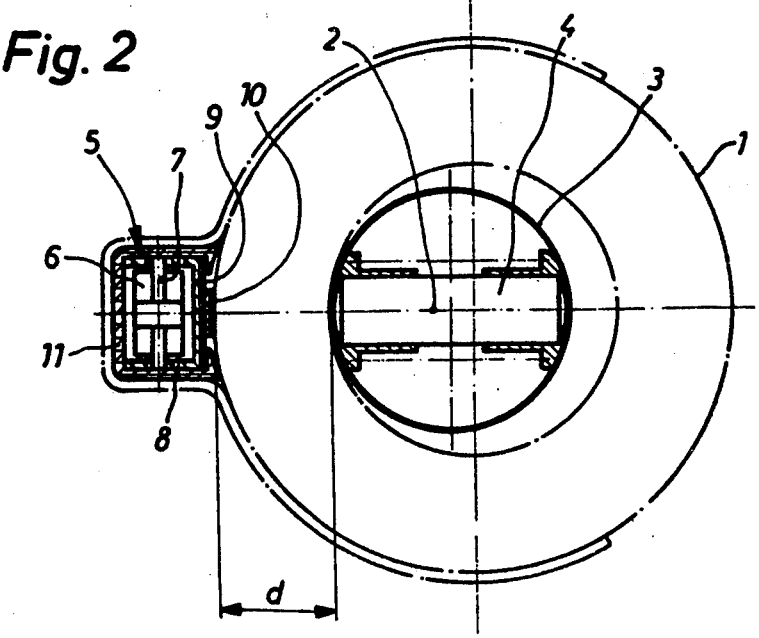
FIG. 2 is a view of a horizontal section of the liquid-level indicator shown in FIG. 1.

A magnetic strip 10 is arranged between the inner web 9 of the rail 5 and the outer wall of tube 1. The magnetic strip 10 extends vertically and is polarized such that it rotationally positions the permanent magnet body 4 of the float 3 with its axis 2 position on the axis 2 to be oriented towards the display device 5 (FIG. 2), and simultaneously pre-tensions the respective display elements 6 which are provided with individual permanent magnets, not particularly shown. In other words, the north pole of the permanent magnet body 4 is attracted by the south pole of the magnetic strip 10 to achieve the desired rotational position of the permanent magnet body 4 relative to the display device 5. On the other hand, the north pole of the magnetic strip 10 attracts the south poles of the respective permanent magnets located within the display elements 6. Such attraction by strip 10 aids in the rotational movement of the display elements 6 needed for the display indication and caused by the permanent magnet body 4. The vertical positions of the display elements 6 are stable positions because the north- or south poles, respectively, of adjoining display elements 6 attract each other in a known way.

The liquid level is displayed through a transparent cover 11 due to the provision of different colors on opposite sides of the respective display elements 6.

It is obvious that no guide means must be provided in order to maintain the desired rotational position of the float 3 relative to the display device 5.

While there is shown and described the presently preferred embodiment of the invention, it is to be distinctly understood that the invention is not limited thereto, but may be otherwise variously embodied and practiced within the scope of the following claims. Accordingly,

What is claimed is:

1. An improved liquid-level indicator for a container in which there is provided: an upstanding tube; float means disposed for vertical movement within said tube, said float means including permanent magnet means polarized in a horizontal plane with opposing north and south poles; and display means disposed outside of said tube in the form of a vertical array of a plurality of rotatably supported display elements, said display elements each including permanent magnet means with opposing poles such that in the absence of said float means, said display elements align vertically by reason of the interaction of the adjacent poles of the respective permanent magnet means thereof; said permanent magnet of said float means interacting with the permanent magnets of said display elements for imparting rotation thereto as said float means moves up or down in said tube, characterized in that a vertically extending magnetic strip, horizontally polarized, is disposed between said display elements and said float means for exerting an attractive force on said permanent magnet means of said float means for causing said magnet means of said float means to orient towards said display elements, said magnetic strip additionally exerting a pre-tensioning force on said magnets of said display elements.

2. An improved liquid-level indicator according to claim 1, characterized in that said magnetic strip is located outside of said tube and at a distance from said float means.

* * * * *

UNITED STATES PATENT AND TRADEMARK OFFICE
CERTIFICATE OF CORRECTION

PATENT NO. : 4,457,171
DATED : July 3, 1984
INVENTOR(S) : Heinz Gebauer

It is certified that error appears in the above—identified patent and that said Letters Patent are hereby corrected as shown below:

Column 1, line 12, "mevement" should read --movement--.

Column 2, lines 16 and 17, "position on the axis 2 to be" should be deleted.

Signed and Sealed this

Fourth Day of December 1984

[SEAL]

Attest:

GERALD J. MOSSINGHOFF

Attesting Officer     Commissioner of Patents and Trademarks